United States Patent
Mitsuoka

(10) Patent No.: US 9,694,711 B2
(45) Date of Patent: Jul. 4, 2017

(54) CONTROLLING APPARATUS FOR VEHICLE

(71) Applicant: MITSUBISHI JIDOSHA KOGYO KABUSHIKI KAISHA, Tokyo (JP)

(72) Inventor: Hidetaka Mitsuoka, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/198,099

(22) Filed: Jun. 30, 2016

(65) Prior Publication Data

US 2017/0015212 A1 Jan. 19, 2017

(30) Foreign Application Priority Data

Jul. 13, 2015 (JP) ................................. 2015-139788

(51) Int. Cl.
*B60L 9/00* (2006.01)
*B60L 15/20* (2006.01)
(Continued)

(52) U.S. Cl.
CPC ................. *B60L 15/20* (2013.01); *B60L 7/14* (2013.01); *B60L 15/2045* (2013.01);
(Continued)

(58) Field of Classification Search
CPC ......... B60L 15/20; B60L 7/14; B60L 15/2045
See application file for complete search history.

(56) References Cited

U.S. PATENT DOCUMENTS 7,756,757 B1 * 7/2010 Oakes, III ............ G06Q 10/047
705/26.1
2008/0126145 A1 * 5/2008 Rackley, III ......... G06Q 20/102
455/406

(Continued)

FOREIGN PATENT DOCUMENTS

DE  10 2012 224 170 A1  3/2014
JP  2006-335216 A  12/2006
(Continued)

OTHER PUBLICATIONS

Extended European Search Report mailed Dec. 6, 2016 in corresponding European Patent Application No. 16178919.3.

*Primary Examiner* — Adam Alharbi
(74) *Attorney, Agent, or Firm* — Birch, Stewart, Kolasch & Birch, LLP

(57) ABSTRACT

A controlling apparatus is provided for controlling a vehicle including a motor for traveling and an inverter for driving the motor. The controlling apparatus includes: an obtainer acquiring information on a front of the vehicle; a determiner judging whether the vehicle is in a coasting state in a regeneration prohibited mode in which a regenerative brake is disabled or not; an estimator forming, if the determiner judges that the vehicle is in the coasting state in the regeneration prohibited mode, an estimate of whether the coasting state in the regeneration prohibited mode is to last for at shortest a predetermined period or not on a basis of the information acquired by the obtainer; and a controller shutting down the inverter if the estimator estimates that the coasting state in the regeneration prohibited mode is to last for at shortest the predetermined period.

10 Claims, 2 Drawing Sheets

(51) Int. Cl.
  *B60W 50/00*   (2006.01)
  *B60W 20/00*   (2016.01)
  *B60W 30/18*   (2012.01)
  *B60L 7/14*    (2006.01)
  *F16H 63/50*   (2006.01)

(52) U.S. Cl.
  CPC ...... *B60W 20/00* (2013.01); *B60W 30/18072* (2013.01); *B60W 50/0097* (2013.01); *F16H 63/50* (2013.01); *B60L 2210/30* (2013.01); *B60L 2210/40* (2013.01); *B60L 2240/16* (2013.01); *B60L 2240/52* (2013.01); *B60L 2240/526* (2013.01); *B60L 2240/642* (2013.01); *B60L 2240/68* (2013.01); *B60L 2260/24* (2013.01); *B60W 30/18127* (2013.01); *B60W 2520/10* (2013.01); *B60W 2540/16* (2013.01); *B60W 2550/10* (2013.01); *B60W 2550/142* (2013.01); *B60W 2550/22* (2013.01); *B60W 2550/308* (2013.01)

(56) References Cited

U.S. PATENT DOCUMENTS

| | | | |
|---|---|---|---|
| 2012/0252621 A1* | 10/2012 | Seidl | B60K 6/52 475/150 |
| 2012/0271497 A1* | 10/2012 | Kleine-Besten | B60W 10/06 701/22 |
| 2013/0060409 A1* | 3/2013 | Matsushita | B60K 6/442 701/22 |
| 2014/0067225 A1 | 3/2014 | Lee et al. | |
| 2015/0019097 A1 | 1/2015 | Morisaki et al. | |
| 2016/0003637 A1* | 1/2016 | Andersen | G01C 21/3617 701/519 |

FOREIGN PATENT DOCUMENTS

| | | |
|---|---|---|
| JP | 2014-079087 A | 5/2014 |
| JP | 2006-042416 A | 2/2016 |
| WO | WO 2013/038498 A1 | 3/2013 |

* cited by examiner

CONTROLLING APPARATUS FOR VEHICLE

CROSS-REFERENCE TO THE RELATED APPLICATION

This application incorporates by references the subject matter of Application No. 2015-139788 filed in Japan on Jul. 13, 2015 on which a priority claim is based under 35 U.S.C.0119(a).

FIELD

The present invention relates to a controlling apparatus for a vehicle, the apparatus being configured to shut down an inverter in a coasting state of the vehicle.

BACKGROUND

Electric-powered vehicles (electric vehicles and hybrid vehicles) each including a motor provided for traveling have a typical purpose of enhancing electrical power efficiency (traveling distance per unit electric power consumption) with the aim of enlarging a cruising range. One of known methods for enhancing electrical power efficiency is to reduce the amount of electric power consumed by an inverter provided for driving the motor. For example, there is a known method which shuts down the inverter when the vehicle is not moving due to traffic lights, and thereby suppresses the electric power consumption. In addition, there is a proposed method which shuts down the inverter when the vehicle is directed to coast (freewheel) while traveling, and there is another proposed method which stops (shuts down) the electric supply for the inverter to cause the vehicle to coast if the velocity of the vehicle varies within a predetermined range for a predetermined period (see Japanese Patent Laid-Open Nos. 2006-42416 and 2014-79087). According to these methods, since the amount of electric power consumed by the inverter can be suppressed, the electrical power efficiency can be enhanced.

SUMMARY

Technical Problems

If the inverter is once shut down, the inverter needs to be reconnected for starting the drive of the motor, so that a response time delay occurs in the motor for a time required to start up the inverter. In view of this, shutting down the inverter is not preferred in situations where the responsiveness of the motor has weight. For example, even when the vehicle is coasting, in situations where an accelerator or a brake is to be operated constantly, the responsiveness of the motor can affect the drivability of the vehicle, so that shutting down the inverter is not preferred. In contrast, if the vehicle is in situations where the driver does not feel uncomfortable with the response time delay in the motor, shutting down the inverter is preferred in the light of enhancing the electrical power efficiency.

With the foregoing problems in view, an object of the present disclosure is to provide a controlling apparatus for controlling a vehicle that is able to achieve both enhanced electrical power efficiency and ensured drivability. Another object of the present disclosure is to achieve advantageous effects that cannot be achieved through the traditional art by employing the configurations described below in the embodiments.

Solution to Problems (1) The controlling apparatus disclosed herein is provided for a vehicle including a motor for traveling and an inverter for driving the motor, the controlling apparatus including: an obtainer acquiring information on a front of the vehicle; a determiner judging whether the vehicle is in a coasting state in a regeneration prohibited mode in which a regenerative brake is disabled or not; an estimator forming, if the determiner judges that the vehicle is in the coasting state in the regeneration prohibited mode, an estimate of whether the coasting state in the regeneration prohibited mode is to last for at shortest a predetermined period or not on a basis of the information acquired by the obtainer; and a controller shutting down the inverter if the estimator estimates that the coasting state in the regeneration prohibited mode is to last for at shortest the predetermined period.

(2) The obtainer may acquire a distance from the vehicle to an object on a road in front of the vehicle; and the estimator may estimate that the coasting state in the regeneration prohibited mode is to last for at shortest the predetermined period if the distance acquired by the obtainer is longer than or equal to a predetermined distance.

(3) The object may be a preceding-vehicle traveling in a lane through which the vehicle is traveling.

(4) The predetermined distance may be set to increase with increase in a velocity of the vehicle.

(5) The predetermined distance may be set as a quadratic function of the velocity of the vehicle.

(6) The controlling apparatus may further include a detector detecting a slope of a road on which the vehicle is traveling, and the estimator may form the estimate on a basis of both the information acquired by the obtainer and the slope detected by the detector.

(7) The estimator may estimate that the coasting state in the regeneration prohibited mode is not to last for at shortest the predetermined period regardless of the information acquired by the obtainer if an absolute value of the slope detected by the detector is larger than a predetermined value.

(8) The predetermined value may be set to increase as a velocity of the vehicle increases on an upslope and as the velocity of the vehicle decreases on a downslope.

Advantageous Effects

According to the disclosed controlling apparatus for a vehicle, if it is estimated that the coasting state in the regeneration prohibited mode in which the regenerative brake is disabled is to last for at shortest the predetermined period, the inverter is shut down. As a consequence, it is possible to achieve both enhanced electrical power efficiency and ensured drivability of the vehicle.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein.

DESCRIPTION OF EMBODIMENTS

The controlling apparatus for a vehicle according to embodiments will now be described with reference to the accompanying drawings. The following embodiment is merely illustrative and not construed to exclude any other modification or application not illustrated in the following description.

1. Configuration of Apparatus

Figure 1:
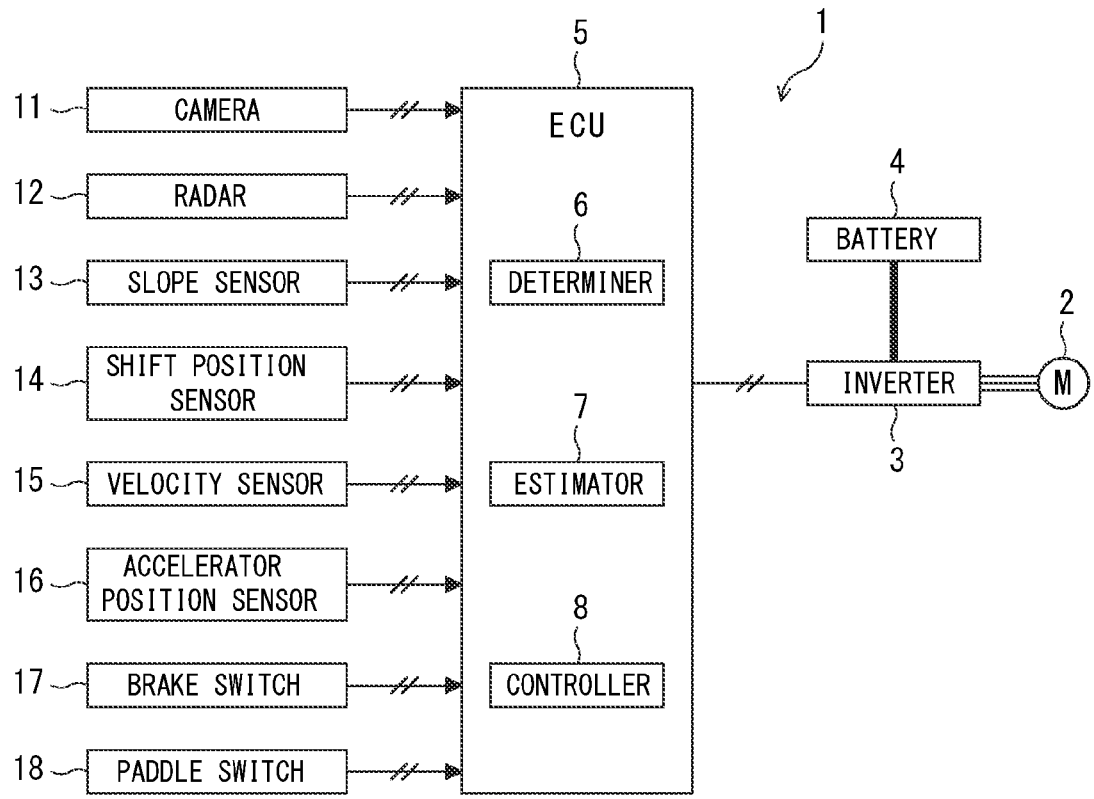
FIG. 1 is a block diagram of the controlling apparatus for a vehicle according to an embodiment.

The controlling apparatus for controlling a vehicle according to the present embodiment is provided for the vehicle 1 depicted in FIG. 1. This vehicle 1 is an electric-powered vehicle (an electric vehicle or a hybrid vehicle), and includes a motor 2 for traveling the vehicle 1 and an inverter 3 for driving the motor 2. The vehicle 1 is equipped with a battery(ies) 4 for storing the electric power to be supplied to the motor 2.

The motor 2 is a motor-generator which functions as both a motor and a generator. The motor 2 is electrically connected to the battery 4 via the inverter 3. The rotating shaft of the motor 2 is mechanically connected to driving wheels (not illustrated) of the vehicle 1. The motor 2 drives the driving wheels by consuming the electric power stored in the battery 4 when functioning as a motor. On the other hand, the motor 2 applies a regenerative brake on the driving wheels and also charges the battery 4 by regenerating electric power from the rotation of the driving wheels when functioning as a generator.

The inverter 3 is an electric-power-converter having an electrical circuit(s) for converting DC power to AC power and vice versa by consuming the electric power stored in the battery 4. When the motor 2 functions as a motor, the inverter 3 converts the DC power in the battery 4 to AC power and supplies the AC electric power to the motor 2. In contrast, when the motor 2 functions as a generator, the inverter 3 converts the AC power generated by the motor 2 to DC power and stores the DC electric power into the battery 4. The inverter 3 establishes an electrical connection between the motor 2 and the battery 4 when the electrical circuit in the inverter 3 is connected, and shuts down the exchange of the electric power between the motor 2 and the battery 4 when the electrical circuit in the inverter 3 is disconnected. In the following description, connecting the electrical circuit in the inverter 3 is also called "connecting the inverter 3," and shutting down the electrical circuit in the inverter 3 is also called "shutting down the inverter 3." The operation state and the connection state of the inverter 3 are controlled by an ECU 5.

The ECU 5 is an electronic control unit installed in the vehicle 1 and connected to a communication line of a network provided in the vehicle 1. The ECU 5 includes, for example, LSI devices or built-in electronic devices, into which known microprocessors, ROM, RAM, and the like are integrated. The ECU 5 controls various matters including the connection (connecting and shutting down) of the electrical circuit of the inverter 3. The ECU 5 is connected to a camera 11, a radar 12, a slope sensor 13, a shift position sensor 14, a velocity sensor 15, an accelerator position sensor 16, a brake switch 17, and a paddle switch 18.

The camera 11 (obtainer) acquires information on a front of the vehicle 1, and is, for example, a CCD-camera, a CMOS camera, or the like, installed at the center of the front portion of the vehicle 1. The camera 11 takes pictures of the front (an area ahead) of the vehicle 1 and transmits the image data to the ECU 5. The image data include objects such as traffic lights, traffic signs, and a preceding-vehicle, which exist on a road ahead of the vehicle 1.

The radar 12 (obtainer) acquires information on a front of the vehicle 1, and is, for example, a laser radar, a millimeter-wave radar, or the like, installed at the center of the front tip portion of the vehicle 1. The radar 12 emits, for example, laser waves toward the front and receives the reflected waves to acquire the information on the preceding-vehicle traveling in a lane through which the vehicle 1 is traveling. The radar 12 transmits the acquired information to the ECU 5. The information on the preceding-vehicle includes at least the distance (following distance) between the vehicle 1 and the preceding-vehicle. In addition, the information on the preceding-vehicle may include an angle (relative position) and/or a velocity (relative velocity) of the preceding-vehicle with respect to the vehicle 1.

The slope sensor 13 (detector) is a clinometer which detects a slope $\theta$ of the road on which the vehicle 1 is traveling, where the slope $\theta$ is an inclination of a longitudinal axis of the vehicle 1 or a vertical slope of the vehicle 1. The slope sensor 13 detects the directions of the slope $\theta$ of the road (i.e., downslope or upslope) and the amount of the slope $\theta$ (i.e., absolute value of the slope $\theta$, slope angle), and transmits the detected information to the ECU 5. The slope sensor 13 may detect zero for the slope $\theta$ of a horizontal road, a positive value for the slope $\theta$ of an upslope road, and a negative value for the slope $\theta$ of a downslope road.

The shift position sensor 14 detects the position (shift position) of the shifter which is operable by the driver. Specifically, the shift position sensor 14 detects the positions such as a parking (P) position, a neutral (N) position, and a drive (D) position. The drive position may be a D range, an E (ECO) range, or a B (BRAKE) range. The shift position sensor 14 transmits the detected information to the ECU 5.

The velocity sensor 15 detects a velocity V of the vehicle 1 and transmits the detected information to the ECU 5.

The accelerator position sensor 16 detects a pressed amount of an accelerator pedal which is operable by the driver (hereinafter, the pressed amount of the accelerator pedal is referred to as an accelerator position), and transmits the detected information to the ECU 5.

The brake switch 17 detects a pressed amount of a brake pedal which is operable by the driver, or whether the driver applies the brake or not, and transmits the detected information to the ECU 5. The brake switch 17 according to the present embodiment outputs an ON signal when the brake pedal is pressed (when the brake is applied), and outputs an OFF signal (or stops outputting the ON signal) when the brake pedal is not pressed (when the brake is not applied).

The paddle switch 18 is an operable switch for the driver to select the magnitude of a regenerative brake force to be applied to the vehicle 1, and provided, for example, on both sides of a steering wheel. In the vehicle 1 of the present embodiment, the magnitude of the regenerative brake force is changeable (settable) to multiple (for example, six) levels ranging from zero to a maximum value. For instance, if the magnitude of the regenerative brake force is set to zero, the motor 2 does not regenerate the electric power even when the accelerator is off (not pressed), not causing the regenerative brake to be applied on the vehicle 1. In contrast, if the magnitude of the regenerative brake force is set to a value greater than zero, the motor 2 regenerates the electric power when the accelerator is off, causing the regenerative brake to be applied on the vehicle 1, and thereby, causes the vehicle 1 to decelerate.

The paddle switch 18 of the present embodiment includes a first switch operable for lowering the magnitude of the regenerative brake force (in other words, for shifting the regenerative brake force in a reducing direction) and a second switch operable for elevating the magnitude of the regenerative brake force (in other words, for shifting the regenerative brake force in an increasing direction). The regenerative brake force is set in accordance with the operation on the paddle switch 18 by the driver. The paddle switch 18 transmits the set information to the ECU 5.

2. Configuration of Control

The controlling apparatus for the vehicle 1, according to the present embodiment includes the camera 11, the radar 12, the various sensing devices 13-18 (hereinafter, collectively referred to as devices 11-18), and the ECU 5, each described above. The ECU 5 controls the inverter 3 on the basis of the information detected or acquired by the devices 11-18.

Specifically, the ECU 5 performs a shut-down control in which the electrical circuit of the inverter 3 is disconnected to shut down the exchange of the electric power between the motor 2 and the battery 4. In the present embodiment, the shut-down control is performed against the inverter 3 in the following three occasions.

(1) an occasion where the vehicle 1 is not moving (i.e., the velocity V of the vehicle 1 equals to zero)

(2) an occasion where the position of the shifter is other than the drive position (i.e., the P or N position)

(3) an occasion where the vehicle 1 is put into a coasting state in a drive mode in which the vehicle 1 does not regenerate the electric power (the regenerative brake is disabled), and the coasting state is estimated to last for at shortest a predetermined period In the above occasions (1) and (2), the motor 2 does not function as a motor or a generator. Because of this, in these occasions, shutting down the inverter 3 can reduce the electric power to be consumed by the inverter 3.

The controlling apparatus of the present embodiment is characterized by the feature that shuts down the inverter 3 also in the above occasion (3). This feature will now be detailed. It is to be noted that the coasting state means a state in which the vehicle 1 is coasting (traveling by inertial force). In other words, the coasting state is a circumstance where the velocity is not zero and neither the accelerator nor the brake is operated.

In occasions where the vehicle 1 is in the coasting state, the motor 2 does not function as a motor since the accelerator is off. However, in occasions where the electric power is regenerated during the coasting state, the motor 2 functions as a generator, so that the electrical circuit of the inverter 3 needs to be connected. In contrast, in occasions where the electric power is not regenerated during the coasting state, the motor 2 does not function as either a motor or a generator, so that the electrical circuit of the inverter 3 can be disconnected without problem. Shutting down the inverter 3 in such particular occasions can suppress the electric power of the battery 4 consumed by the inverter 3, and thus, results in enhancement of the electrical power efficiency of the vehicle 1.

On the other hand, if the inverter 3 is once shut down, the inverter 3 needs to be connected for starting the drive of the motor 2, so that a response time delay occurs in the motor 2 for the time taken to start up the inverter 3. The response time delay in the motor 2 may affect the drivability of the vehicle 1 in situations where the accelerator or the brake is to be operated constantly.

In view of this, the controlling apparatus of the present embodiment does not perform the shut-down control in situations where the motor 2 is not driven at the moment but is expected to start operating soon after (that is, occasions where the coasting state is expected to end before the predetermined period passes). Thus, even in the occasions where the electric power is not regenerated during the coasting state, if the electric power is expected to be regenerated, or the accelerator or the brake is expected to be operated before the predetermined period passes, the inverter 3 remains connected. This prevents the response time delay in the motor 2, and thus, ensures the drivability of the vehicle 1.

As such, when the electric power is not regenerated (the regenerative brake is disabled), the controlling apparatus of the present embodiment performs the shut-down control not at every occasion where the vehicle 1 is put into the coasting state, but at the occasion where it is estimated that "the coasting state is to last for at shortest the predetermined period." Thereby, the controlling apparatus achieves both enhanced electrical power efficiency and ensured drivability.

The ECU 5 includes a determiner 6, an estimator 7, and a controller 8, each of which is a functional element for performing the above-mentioned shut-down control. Each of these elements may be implemented by electronic circuitry (hardware) or may be programed as software. Alternatively, some of the functions may be provided as hardware while the remaining functions may be implemented by software.

The determiner 6 gives a judgement on whether the vehicle 1 is in the coasting state in a regeneration prohibited mode or not. The regeneration prohibited mode is a drive mode in which the regeneration of the electric power is prohibited, such that the electric power is not regenerated during the coast even if the accelerator is off. In other words, if the vehicle 1 is in the regeneration prohibited mode, the generative brake is not applied on the vehicle 1. The vehicle 1 is in the regeneration prohibited mode when the magnitude of the regenerative brake force is set to zero and the shifter is at the drive position. The determiner 6 judges whether the vehicle 1 is in the regeneration prohibited mode or not on the basis of the information transmitted from the paddle switch 18 and the shift position sensor 14.

If the determiner 6 judges that the vehicle 1 is in the regeneration prohibited mode, the determiner 6 further judges whether the vehicle 1 is in the coasting state or not on the basis of the information transmitted from the velocity sensor 15, the accelerator position sensor 16, and the brake switch 17. The determiner 6 of the present embodiment decides that the vehicle 1 is in the coasting state if the velocity V of the vehicle 1 is not zero and neither the accelerator nor the brake is operated (i.e., there is no acceleration or deceleration demand from the driver), namely, if a torque value of the motor 2 calculated on the basis of, for example, the accelerator position or the pressed amount of the brake equals to zero.

If the determiner 6 judges that "the vehicle 1 is in the coasting state in the regeneration prohibited mode," the determiner 6 transmits the result of the judgement to the estimator 7. Otherwise (for example, if the magnitude of the regenerative brake force is set to a value greater than zero, or the vehicle 1 is not moving), the determiner 6 transmits the result of the judgement to the controller 8. The determiner 6 gives such a judgement in a predetermined calculation cycle.

The estimator 7 forms, if the determiner 6 judged that "the vehicle 1 is in the coasting state in the regeneration prohibited mode," an estimate (judgement) of whether it is a situation where the coasting state in the regeneration prohibited mode is to last for at shortest the predetermined period or not. In other words, the estimator 7 forms the estimate of whether the coasting state is to last for at shortest the predetermined period from the moment the determiner 6 judges that "the vehicle 1 is in the coasting state in the regeneration prohibited mode." The estimator 7 of the present embodiment forms the estimate on the basis of both the information on the front of the vehicle 1 and the slope $\theta$ of the road on which the vehicle 1 is traveling. The above-described coasting state in the regeneration prohibited mode ends, for example, when the accelerator or the brake is operated, or when the paddle switch 18 is operated such that the regenerative brake force is applied (the electric power is regenerated). Thus, the estimator 7 forms the above estimate by judging whether such operations are likely to be performed or not on the basis of the current traveling situation.

Specifically, the estimator 7 estimates that "the coasting state in the regeneration prohibited mode is to last for at shortest the predetermined period" if all of the following four conditions (conditions 1-4) are satisfied. In contrast, the estimator 7 estimates that "the coasting state in the regeneration prohibited mode is not to last for at shortest the predetermined period" if at least one of the following four conditions is not satisfied. This result of the estimation means that "the coasting state in the regeneration prohibited mode is to end before the predetermined period passes." The predetermined period is set beforehand in view of the balance between the responsiveness of the motor 2 and the amount of the electric power consumed by the inverter 3 (or the electric power consumption to be reduced by shutting down the inverter 3). The estimator 7 transmits the result of the estimation to the controller 8.

Condition 1: the velocity V of the vehicle 1 is within a predetermined range (Vmin≤V≤Vmax)

Condition 2: the distance D1 to the traffic light on the road ahead of the vehicle 1 is longer than or equal to a first predetermined distance $D_{th1}$ (D1≥$D_{th1}$)

Condition 3: the following distance D2 to the preceding-vehicle traveling in the lane through which the vehicle 1 is traveling is longer than or equal to a second predetermined distance $D_{th2}$ (D2≥$D_{th2}$)

Condition 4: an absolute value of the slope $\theta$ of the road on which the vehicle 1 is traveling is smaller than or equal to a predetermined value $\alpha$ (|$\theta$|≤$\alpha$)

Condition 1 regulates the range of the velocity V of the vehicle 1. If the velocity V is too high, the driver is likely to apply the brake to decelerate, or to operate the paddle switch 18 to apply the regenerative brake force. On the other hand, if the velocity V is too low, the driver is likely to operate the accelerator for acceleration. In view of these, the present embodiment employs the condition where the velocity V of the vehicle 1 is within the range (Vmin≤V≤Vmax) not being too high or too low, as one of the conditions for estimating that "the coasting state in the regeneration prohibited mode is to last for at shortest the predetermined period." The lower limit Vmin and the upper limit Vmax each regulated in the range of the velocity V are set in advance and memorized in a storage (ROM or RAM) provided within the ECU 5 for example.

The estimator 7 judges whether condition 1 is satisfied or not on the basis of, for example, the information transmitted from the velocity sensor 15. The estimator 7 of the present embodiment judges that "condition 1 is satisfied" if the velocity V is within the predetermined range, and proceeds to the judgement on whether condition 2 is satisfied or not. In contrast, the estimator 7 judges that "condition 1 is not satisfied" if the velocity V is not within the predetermined range. In this case, the estimator 7 estimates that "the coasting state in the regeneration prohibited mode is to end before the predetermined period passes" and transmits the result of the estimation to the controller 8, omitting the judgements on whether conditions 2-4 are satisfied or not.

Condition 2 regulates the distance D1 from the vehicle 1 to the traffic light on the road ahead of the vehicle 1. As getting closer to the traffic light ahead while traveling, the driver becomes more likely to operate the accelerator to get past the traffic light, or to apply the brake to stop in front of the traffic light. In addition to or as an alternative to the brake, the driver may operate the paddle switch 18 to apply the regenerative brake force. Because of these, the shorter the distance D1 between the vehicle 1 and the traffic light is, the more likely the duration of the coasting state in the regeneration prohibited mode is to shorten. In view of this, the present embodiment employs the condition where the distance D1 between the vehicle 1 and the traffic light is sufficiently long (D1≥$D_{th1}$), as one of the conditions for estimating that "the coasting state in the regeneration prohibited mode is to last for at shortest the predetermined period."

The satisfaction of condition 2 corresponds to the presumption that, even if the coasting state in the regeneration prohibited mode lasted for the predetermined period, the vehicle 1 would not be close to the traffic light (would not reach the traffic light and would still be away from the traffic light). In other words, the first predetermined distance $D_{th1}$ (predetermined distance) is set to a value longer than a coast distance that the vehicle 1 is assumed to travel if the vehicle 1 coasts without regenerating the electric power for the predetermined period. The first predetermined distance $D_{th1}$ maybe a fixed value set in advance as a constant, or a variable to be set in accordance with the velocity V of the vehicle 1. If the first predetermined distance $D_{th1}$ is set as a fixed value, it is preferred that the first predetermined distance $D_{th1}$ is set on the basis of the upper limit Vmax of the velocity V (maximum velocity) in the range regulated by condition 1.

The estimator 7 acquires the above distance D1 by, for example, processing the image data transmitted from the camera 11, and judges whether condition 2 is satisfied or not on the basis of a comparison of the acquired distance D1 to the first predetermined distance $D_{th1}$. The estimator 7 of the present embodiment judges that "condition 2 is satisfied" if the distance D1 is longer than or equal to the first predetermined distance $D_{th1}$, and proceeds to the judgement on whether condition 3 is satisfied or not. In contrast, the estimator 7 judges that "condition 2 is not satisfied" if the distance D1 is shorter than the first predetermined distance $D_{th1}$. In this case, the estimator 7 estimates that "the coasting state in the regeneration prohibited mode is to end before the predetermined period passes" and transmits the result of the estimation to the controller 8, omitting the judgements on whether conditions 3 and 4 are satisfied or not.

Condition 3 regulates the following distance D2 between the vehicle 1 and the preceding-vehicle traveling in the lane through which the vehicle 1 is traveling. As the following distance D2 to the preceding-vehicle shortens while traveling, the driver becomes more likely to apply the brake to keep the following distance D2, or to operate the paddle switch 18 to apply the regenerative brake force. Alternatively, when the following distance D2 shortens, the driver may operate the accelerator to pass the preceding-vehicle. Because of these, the shorter the following distance D2 between the vehicle 1 and the preceding-vehicle is, the more likely the duration of the coasting state in the regeneration prohibited mode is to shorten. In view of this, the present embodiment employs the condition where the following distance D2 between the vehicle 1 and the preceding-vehicle is sufficiently long (D2≥$D_{th2}$), as one of the conditions for estimating that "the coasting state in the regeneration prohibited mode is to last for at shortest the predetermined period."

The satisfaction of condition 3 corresponds to the presumption that, even if the coasting state in the regeneration prohibited mode lasted for the predetermined period, the following distance D2 between the vehicle 1 and the preceding-vehicle would be kept longer than a suitable distance. In other words, the second predetermined distance $D_{th2}$ (predetermined distance) is set to a value longer than a sum (accumulation) of a coast distance that the vehicle 1 is assumed to travel while coasting without regenerating the electric power for the predetermined period and the suitable distance (preset value) for the following distance D2 between the vehicle and the preceding-vehicle. The second predetermined distance $D_{th2}$ of the present embodiment is a variable to be set in accordance with the velocity V of the vehicle 1 such that the following distance D2 between the vehicle 1 and the preceding-vehicle would be kept at shortest the suitable distance if the coasting state in the regeneration prohibited mode lasted for the predetermined period. The above-mentioned suitable distance may be a fixed value set in advance as a constant, or a variable to be set in accordance with the velocity V of the vehicle 1.

The estimator 7 of the present embodiment judges whether condition 3 is satisfied or not on the basis of the length relationship of the following distance D2 and the second predetermined distance $D_{th2}$. This judgement is made by, for example, using a map illustrated in FIG. 2. The map of FIG. 2 is memorized in a storage (ROM or RAM) provided within the ECU 5 for example.

Figure 2:
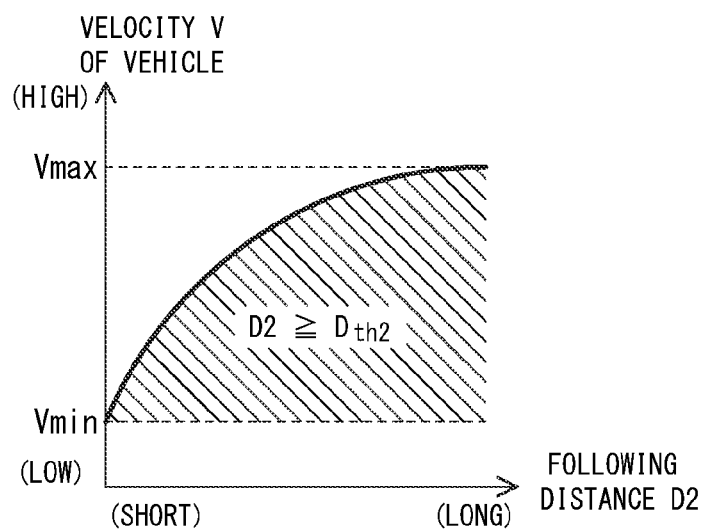
FIG. 2 is an exemplified map of a second predetermined distance memorized in the controlling apparatus of FIG. 1.

The solid line in FIG. 2 illustrates the second predetermined distance $D_{th2}$. The second predetermined distance $D_{th2}$ is set to increase as the velocity V of the vehicle 1 increases. This is because the braking distance and the coastable distance of the vehicle 1 each correlate with the velocity V of the vehicle 1. For example, the coastable distance of the vehicle 1 is proportional to the square of the velocity V of the vehicle 1. For this reason, in the present embodiment, the second predetermined distance $D_{th2}$ is set as a quadratic function of the velocity V of the vehicle 1. In the present embodiment, since satisfaction (or unsatisfaction) of condition 2 is judged only when condition 1 is satisfied, the second predetermined distance $D_{th2}$ is set for the velocity V only within the predetermined range regulated by condition 1.

The estimator 7 plots a point corresponding to both the velocity V of the vehicle 1 and the following distance D2 on the map of FIG. 2 on the basis of, for example, the information transmitted from the velocity sensor 15 and the radar 12. The estimator 7 judges that "condition 3 is satisfied" if the point falls within the hatched area in the map, while the estimator 7 judges that "condition 3 is not satisfied" if the point falls out of the hatched area. If the estimator 7 judges that "condition 3 is satisfied," the estimator 7 of the present embodiment proceeds to the judgement on whether condition 4 is satisfied or not. In contrast, if the estimator 7 judges that "condition 3 is not satisfied," the estimator 7 estimates that "the coasting state in the regeneration prohibited mode is to end before the predetermined period passes" and transmits the result of the estimation to the controller 8, omitting the judgement on whether condition 4 is satisfied or not.

Condition 4 regulates the slope θ of the road on which the vehicle 1 is traveling. If the absolute value of the slope θ of the road on which the vehicle 1 is traveling is large, the driver is likely to operate the accelerator or the brake, or the paddle switch 18 to apply the regenerative brake force, with an aim to suppress the change in the velocity V of the vehicle 1. Because of this, the steeper the slope θ of the road is, the more likely the duration of the coasting state in the regeneration prohibited mode is to shorten. In view of this, the present embodiment employs the condition where the absolute value of the slope θ of the road is smaller than or equal to the predetermined value α (|θ|≤α), as one of the conditions for estimating that "the coasting state in the regeneration prohibited mode is to last for at shortest the predetermined period." In other words, if the absolute value of the slope θ of the road is larger than the predetermined value α (|θ|>α), the estimator 7 estimates that "the coasting state in the regeneration prohibited mode is to end before the predetermined period passes" regardless of the information on the front of the vehicle 1.

The estimator 7 of the present embodiment judges whether condition 4 is satisfied or not on the basis of the magnitude relationship between the absolute value of the slope θ of the road and the predetermined value α set in accordance with the velocity V of the vehicle 1. This judgement is made by, for example, using a map illustrated in FIG. 3. The map of FIG. 3 is memorized in a storage (ROM or RAM) provided within the ECU 5 for example.

Figure 3:
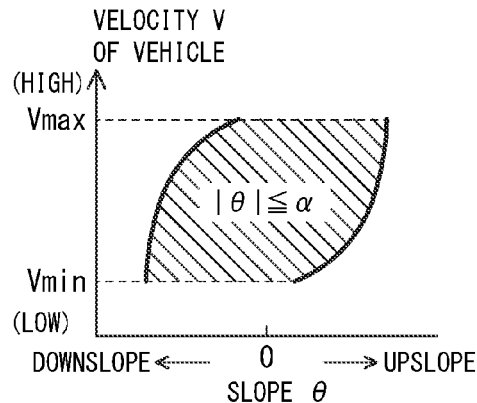
FIG. 3 is an exemplified map of a predetermined value memorized in the controlling apparatus of FIG. 1.

The solid line in FIG. 3 illustrates the predetermined value α. The predetermined value α is set to increase as the velocity V of the vehicle 1 increases if the road is an upslope, and as the velocity V of the vehicle 1 decreases if the road is a downslope. This is because, if the coasting state in the regeneration prohibited mode continues, both the slope θ of the road and the velocity V at the moment of the judgement that the vehicle 1 is in the coasting state in the regeneration prohibited mode affect the velocity V at a moment the predetermined period later than the moment of the judgement.

In detail, when the vehicle 1 coasts an upslope, although the velocity V decreases in the course of the coast, higher velocity V at the moment of the judgement that the vehicle 1 is in the coasting state in the regeneration prohibited mode less lowers (i.e., the velocity V is likely to remain relatively high) during the coast on the upslope for the predetermined period from the moment of the judgement. Because of this, in the coast on an upslope, the higher the velocity V is at the moment of the judgement that the vehicle 1 is in the coasting state in the regeneration prohibited mode, the longer the period until the accelerator is operated becomes (i.e., the less likely the driver is to operate the accelerator before the predetermined period passes from the moment). Thus, on an upslope, the estimate is formed on the basis of the predetermined value α set to increase with increase in the velocity V. Conversely, the more gradual the road is, the smaller the decrease in the velocity V during the coast becomes, so that the longer the period until the accelerator is operated becomes. Thus, on the upslope, the estimate is formed on the basis of the predetermined value α set to decrease with decrease in the velocity V.

In contrast, when the vehicle 1 coasts a downslope, although the velocity V increases in the course of the coast, lower velocity V at the moment of the judgement that the vehicle 1 is in the coasting state in the regeneration prohibited mode less increases (i.e., the velocity V is likely to remain relatively low) during the coast on the downslope for the predetermined period from the moment of the judgement. Because of this, in the coast on a downslope, the lower the velocity V is at the moment of the judgement that the vehicle 1 is in the coasting state in the regeneration prohibited mode, the longer the period until the brake or the paddle switch 18 is operated becomes (i.e., the less likely the driver is to operate the brake or the like before the predetermined period passes from the moment). Thus, on a downslope, the estimate is formed on the basis of the predetermined value $\alpha$ set to increase with decrease in the velocity V. Conversely, the more gradual the road is, the smaller the increase in the velocity V during the coast becomes, so that the longer the period until the brake or the like is operated becomes. Thus, on the downslope, the estimate is formed on the basis of the predetermined value $\alpha$ set to decrease with decrease in the velocity V.

As described above, in the present embodiment, the predetermined value $\alpha$ is set in accordance with the velocity V of the vehicle 1 and both the absolute value and the direction of the slope $\theta$ of the road. As in the case of the above second predetermined distance $D_{th2}$, the predetermined value $\alpha$ is set as a quadratic function of the velocity V of the vehicle 1. In the present embodiment, since satisfaction (or unsatisfaction) of condition 4 is judged only when condition 1 is satisfied, the predetermined value $\alpha$ is set for the velocity V only within the predetermined range regulated by condition 1.

The estimator 7 plots a point corresponding to both the velocity V of the vehicle 1 and the slope $\theta$ of the road on the map of FIG. 3 on the basis of, for example, the information transmitted from the velocity sensor 15 and the slope sensor 13. If the point falls within the hatched area in the map, the estimator 7 judges that "condition 4 is satisfied" and estimates that "the coasting state in the regeneration prohibited mode is to last for at shortest the predetermined period." In contrast, if the point falls out of the hatched area, the estimator 7 judges that "condition 4 is not satisfied" and estimates that "the coasting state in the regeneration prohibited mode is to end before the predetermined period passes." The estimator 7 transmits the result of the estimation to the controller 8.

The controller 8 controls the connection and shut-down (the connection state of the electrical circuit) of the inverter 3 on the basis of the information transmitted from the determiner 6 and the estimator 7. The controller 8 shuts down the inverter 3 if the estimator 7 estimates that "the coasting state in the regeneration prohibited mode is to last for at shortest the predetermined period," and connects the inverter 3 if the estimator 7 estimates that "the coasting state in the regeneration prohibited mode is to end before the predetermined period passes."

Accordingly, if the coasting state in the regeneration prohibited mode of the vehicle 1 is presumed not to end soon, but to last for the predetermined period or more, the controller 8 disconnects the electrical circuit of the inverter 3. This reduces the amount of the electric power to be consumed by the inverter 3. On the other hand, if the coasting state in the regeneration prohibited mode of the vehicle 1 is presumed to end soon, the controller 8 keeps the connected state of the electrical circuit of the inverter 3. This ensures a degree of the responsiveness of the inverter 3.

The controller 8 shuts down the inverter 3 on the basis of the result estimated by the estimator 7 in an occasion where, for example, no preceding-vehicle or tollgate exists ahead of the vehicle 1 when the vehicle 1 is put into the coasting state while traveling a highway in the regeneration prohibited mode. Further in such an occasion, if a preceding-vehicle appears in a short distance (within the second predetermined distance $D_{th2}$) ahead of the vehicle 1, the controller 8 connects the inverter 3, which has just been shut down. In contrast, the controller 8 keeps the inverter 3 connected on the basis of the result estimated by the estimator 7, in an occasion where, for example, a preceding-vehicle exists in a short distance (within the second predetermined distance $D_{th2}$) ahead of the vehicle 1 when the vehicle 1 is put into the coasting state while traveling in the regeneration prohibited mode.

The controller 8 of the present embodiment shuts down the inverter 3 also in occasions where the vehicle 1 is not moving and where the shifter is at the P or N position. The judgement on whether the vehicle 1 is moving or not can be made on the basis of, for example, the information transmitted from the velocity sensor 15. The judgement on whether the shifter is at the P or N position or not can be made on the basis of, for example, the information transmitted from the shift position sensor 14. The controller 8 may make these judgements. Alternatively, an element other than the controller 8 (for example, the determiner 6) may make these judgements and transmit the results of the judgements to the controller 8.

3. Flow Chart

Figure 4:
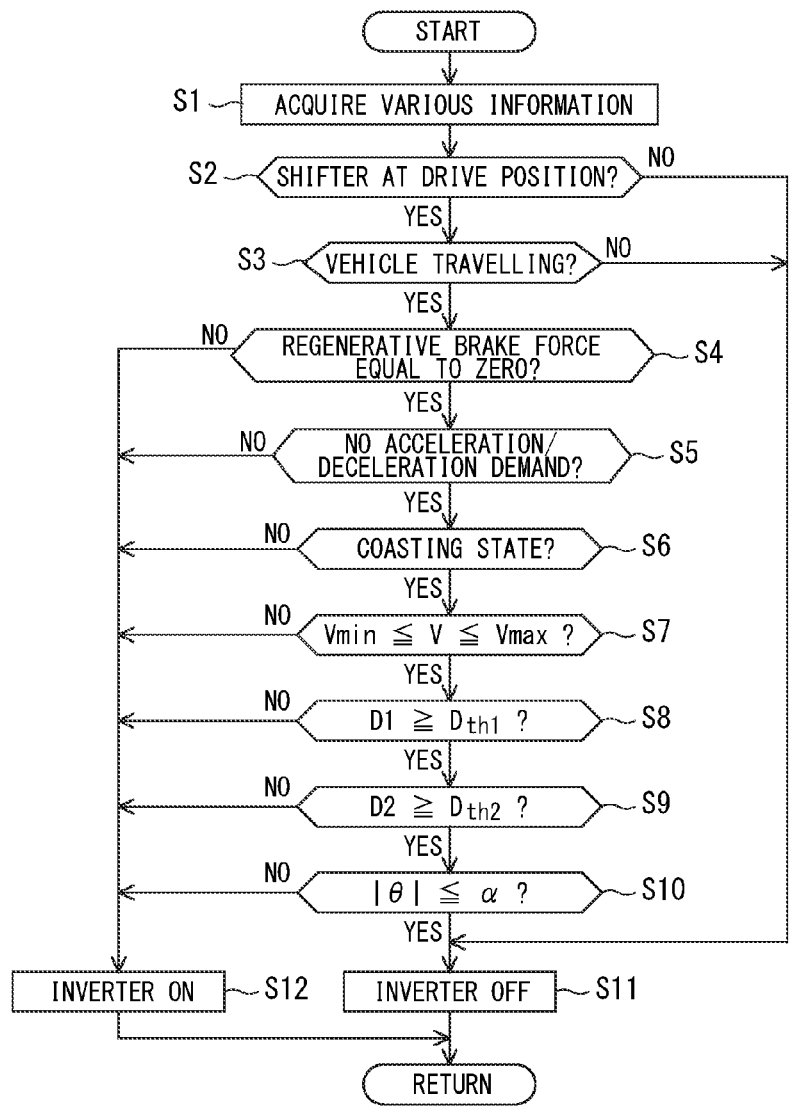
FIG. 4 is a flow chart illustrating the process to be executed by the controlling apparatus of FIG. 1.

FIG. 4 is a flow chart illustrating a process of the above shut-down control. The ECU 5 repeatedly carries out the steps of this flow chart in a predetermined calculation cycle while the vehicle 1 is powered on.

At step S1, various pieces of information are acquired from the devices 11-18. At step S2, the determiner 6 judges whether the shifter is at the drive position or not, and if the result of the judgement is positive, at step S3, the determiner 6 judges whether the vehicle 1 is traveling or not. If the vehicle 1 is traveling, the flow proceeds to step S4. In contrast, each NO route at the judgements of steps S2 and S3 proceeds to step S11.

At step S4, the determiner 6 judges whether the magnitude of the regenerative brake force is set to zero or not. If the result of the judgement is positive, at step S5, the determiner 6 judges whether there is an acceleration or deceleration demand. The acceleration or deceleration demand is judged from the operations of the accelerator and the brake. If both of the accelerator and the brake are off, the determiner 6 makes a judgement of "NO ACCELERATION/DECELERATION DEMAND," and at step S6, further judges whether the vehicle 1 is in the coasting state (that is, whether the torque value of the motor 2 calculated on the basis of, for example, the accelerator position or the pressed amount of the brake equals to zero) or not. Accordingly, steps S2 and S4 are the processes for judging whether the vehicle 1 is in the regeneration prohibited mode or not, while steps S3, S5, and S6 are the processes for judging whether the vehicle 1 is in the coasting state or not.

The YES route of the judgement at step S6 means that "the vehicle 1 is in the coasting state in the regeneration prohibited mode, " and proceeds to the judgements of step S7 and beyond. In contrast, each NO route at the judgements of steps S4-S6 does not mean that "the vehicle 1 is in the coasting state in the regeneration prohibited mode," and proceeds to step S12.

At steps S7-S10, the estimator 7 judges whether conditions 1-4 are satisfied or not. Specifically, the estimator 7 judges whether the velocity V of the vehicle 1 is within the predetermined range (Vmin≤V≤Vmax) or not, and if Vmin≤V≤Vmax, proceeds to the judgement on condition 2.

At step S8, the estimator 7 judges whether the distance D1 to the traffic light is longer than or equal to the first predetermined distance $D_{th1}$ ($D1 \geq D_{th1}$) or not, and if $D1 \geq D_{th1}$, proceeds to the judgement on condition 3. At step S9, the estimator 7 judges whether the following distance D2 is longer than or equal to the second predetermined distance $D_{th2}$ ($D2 \geq D_{th2}$) or not with reference to the map of FIG. 2, and if $D2 \geq D_{th2}$, proceeds to the judgement on condition 4. At step S10, the estimator 7 judges whether the absolute value of the slope θ is smaller than or equal to the predetermined value α ($|θ| \leq α$) or not with reference to the map of FIG. 3.

Accordingly, steps S7-S10 are the process for estimating whether the coasting state in the regeneration prohibited mode is to last for at shortest the predetermined period or not. If $|θ| \leq α$ at step S10, the estimator 7 estimates that "the coasting state in the regeneration prohibited mode is to last for at shortest the predetermined period," and proceeds to step S11. In contrast, if NO route is taken at any one of the judgements at steps S7-S10, the estimator 7 estimates that "the coasting state in the regeneration prohibited mode is to end before the predetermined period passes," and proceeds to step S12.

At step S11, the controller 8 controls the inverter 3 such that the inverter 3 is put into a disconnected state, and returns the flow. Specifically, if the inverter 3 is in a connected state, the controller 8 disconnects the electrical circuit, whereas, if the inverter 3 is already in the disconnected state, the controller 8 keeps the disconnected state of the inverter 3. In contrast, at step S12, the controller 8 controls the inverter 3 such that the inverter 3 is put into a connected state, and returns the flow. Specifically, if the inverter 3 is in the disconnected state, the controller 8 connects the electrical circuit, whereas, if the inverter 3 is already in the connected state, the controller 8 keeps the connected state of the inverter 3.

4. Advantageous Effects (1) The above controlling apparatus for the vehicle 1 shuts down the inverter 3 if the coasting state is estimated to last for at shortest the predetermined period on the basis of the information on the front of the vehicle 1 while the vehicle 1 is in the coasting state in the regeneration prohibited mode in which the regenerative brake is disabled. Accordingly, since the inverter 3 is shut down in situations where the coasting state is expected to last long in the regeneration prohibited mode, the amount of the electric power to be consumed by the inverter 3 can be suppressed and thus, the electrical power efficiency of the vehicle 1 can be enhanced. In contrast, since the connection state of the inverter 3 is maintained in situations where the coasting state is not expected to last long in the regeneration prohibited mode, the responsiveness of the motor 2 (the drivability) can be ensured. Therefore, the above controlling apparatus for the vehicle 1 can achieve both enhanced electrical power efficiency and ensured drivability of the vehicle 1.

(2) The above controlling apparatus shuts down the inverter 3 if the distances D1 and D2 from the vehicle 1 to the traffic light and the preceding-vehicle, respectively, each of which is existing on the road ahead of the vehicle 1, are longer than or equal to the respective predetermined distances $D_{th1}$ and $D_{th2}$. The shorter the distances D1 and D2 between the vehicle and an object such as the traffic light and the preceding-vehicle are, the more likely the driver is to operate the accelerator or the brake, or to apply the regenerative brake. Thus, by making it a condition that the distances D1 and D2 are longer than or equal to the respective predetermined distances $D_{th1}$ and $D_{th2}$, the accuracy of the estimation by the estimator 7 can be enhanced. As a consequence, the connection and the shut-down of the inverter 3 can be properly controlled, so that it is possible to achieve both the enhanced electrical power efficiency and the ensured drivability of the vehicle 1 more sufficiently.

(3) The driver is likely to operate the accelerator or the brake in response to the motion of the preceding-vehicle traveling in the lane through which the vehicle 1 is traveling. Because of this, by estimating whether the coasting state in the regeneration prohibited mode is to last for at shortest the predetermined period or not on the basis of the following distance D2 to the preceding-vehicle, the accuracy of the estimation can be further enhanced. As a consequence, the connection and the shut-down of the inverter 3 can be more properly controlled, so that it is possible to achieve both the enhanced electrical power efficiency and the ensured drivability of the vehicle 1 more sufficiently.

(4) The above controlling apparatus estimates whether the coasting state in the regeneration prohibited mode is to last for at shortest the predetermined period or not by using the second predetermined distance $D_{th2}$ set to increase with the velocity V of the vehicle 1. The braking distance and the coastable distance of the vehicle 1 each prolongs with increase in the velocity V of the vehicle 1. Because of this, by setting the second predetermined distance $D_{th2}$ to increase with the velocity V of the vehicle 1, the accuracy of the estimation by the estimator 7 can be further enhanced. As a consequence, the connection and the shut-down of the inverter 3 can be more properly controlled, so that it is possible to achieve both the enhanced electrical power efficiency and the ensured drivability of the vehicle 1 more sufficiently.

(5) The above controlling apparatus estimates whether the coasting state in the regeneration prohibited mode is to last for at shortest the predetermined period or not by using the second predetermined distance $D_{th2}$ set as a quadratic function of the velocity V of the vehicle 1. Since the braking distance and the coastable distance of the vehicle 1 are both proportional to the square of the velocity V of the vehicle 1, setting the predetermined distance $D_{th2}$ in such a manner can further enhance the accuracy of the estimation by the estimator 7. As a consequence, the connection and the shut-down of the inverter 3 can be more properly controlled, so that it is possible to achieve both the enhanced electrical power efficiency and the ensured drivability of the vehicle 1 more sufficiently.

(6) The driver is likely to operate the accelerator or the brake to cope with the slope θ of the road on which the vehicle 1 is traveling. For example, the driver may press the accelerator on an upslope for not causing the vehicle 1 to decelerate, and may press the brake or change the setting to apply the regenerative brake force on a downslope for suppressing an increase in the velocity V. In view of this, by forming the estimate on the basis of the slope θ of the road on which the vehicle 1 is traveling in addition to the information on the front of the vehicle 1, the accuracy of the estimation can be further enhanced. As a consequence, the connection and the shut-down of the inverter 3 can be more properly controlled, so that it is possible to achieve both the enhanced electrical power efficiency and the ensured drivability of the vehicle 1 more sufficiently.

(7) The steeper the slope θ of the road on which the vehicle 1 is traveling is, the more likely the driver is to operate the accelerator or the brake, or to apply the regenerative brake. For example, on an upslope, the larger the absolute value of the slope θ is, the more likely the vehicle 1 is to decelerate, so that the more likely the accelerator is to be operated. On a downslope, on the other hand, the larger the absolute value of the slope θ is, the more likely the vehicle 1 is to accelerate, so that the more likely the brake is to be operated or the setting of the paddle switch 18 is to be changed. In view of these, the above controlling apparatus does not shut down the inverter 3 regardless of the information on the front of the vehicle 1 if the absolute value of the slope θ of the road on which the vehicle 1 is traveling is larger than the predetermined value α while the vehicle 1 is in the coasting state in the regeneration prohibited mode. This can ensure the responsiveness of the motor 2 in cases where the accelerator or the brake is operated. Besides, since the inverter 3 is shut down on a condition that the absolute value of the slope θ is less than or equal to the predetermined value α, the accuracy of the estimation by the estimator 7 can be further enhanced, so that the inverter 3 can be more properly controlled. For the above, it is possible to achieve both the enhanced electrical power efficiency and the ensured drivability of the vehicle 1 more sufficiently.

(8) The above controlling apparatus sets the predetermined value α to increase as the velocity V of the vehicle 1 increases on an upslope and as the velocity V of the vehicle 1 decreases on a downslope, and uses this predetermined value α to form the estimate. On an upslope, while the velocity V continues to decrease, the higher the velocity V is at the moment of the judgement that the vehicle 1 is in the coasting state in the regeneration prohibited mode, the higher the velocity V remains at a moment the predetermined period later than the moment of the judgement. Because of this, on an upslope, even if the absolute value of the slope θ is high, the accelerator is less likely to be operated before the predetermined period passes. In contrast, on a downslope, while the velocity V continues to increase, the lower the velocity V is at the moment of the judgement that the vehicle 1 is in the coasting state in the regeneration prohibited mode, the lower the velocity V remains at a moment the predetermined period later than the moment of the judgement. Because of this, on a downslope, even if the absolute value of the slope θ is high, the brake or the paddle switch 18 is less likely to be operated before the predetermined period passes. As such, by setting the predetermined value α to increase as the velocity V of the vehicle 1 increases on an upslope and as the velocity V of the vehicle 1 decreases on a downslope, the accuracy of the estimation by the estimator 7 can be further enhanced. As a consequence, the connection and the shut-down of the inverter 3 can be more properly controlled, so that it is possible to achieve both the enhanced electrical power efficiency and the ensured drivability of the vehicle 1 more sufficiently.

5. Others

The above embodiment may be modified in various manners within the purpose of the invention. The elements of the present embodiment can be combined in any form as appropriate, and some of the elements may be omitted.

The above embodiment assumes a configuration that estimates whether the coasting state in the regeneration prohibited mode is to last for at shortest the predetermined period or not on the basis of both the information on the front of the vehicle 1 and the slope θ of the road on which the vehicle 1 is traveling, but other configurations are also applicable as far as the estimation is carried out on the basis of the information on the front of the vehicle 1. In other words, one of conditions 2 and 3 may suffice the case, and conditions 1 and 4 may both be omitted. Even with such configurations, it is possible to estimate whether the coasting state in the regeneration prohibited mode is to last for at shortest the predetermined period or not on the basis of the information on the front of the vehicle 1, and by shutting down the inverter 3 if the state is estimated to last for at shortest the predetermined period, it is possible to achieve both enhanced electrical power efficiency and ensured drivability of the vehicle 1.

In the above embodiment, the information on the front of the vehicle 1 is exemplified by the distance D1 to the traffic light and the following distance D2 to the preceding-vehicle. However, the information on the front of the vehicle 1 should not be limited to those. For example, the information on the front of the vehicle 1 may be the existence of an accident-vehicle on the road ahead, construction of the road ahead, or a sharp curve ahead, etc. Further, conditions 1-4 described in the above embodiment are merely examples and may be changed. For instance, in addition to or as an alternative to condition 2, a distance between the vehicle 1 and a stop sign (traffic sign) existing on the road ahead of the vehicle 1 may be conditioned to be longer than or equal to the first predetermined distance $D_{th1}$. Another instance may include a configuration that identifies the color of the traffic light existing ahead of the vehicle 1 and estimate the continuation of the coasting state on the basis of the identified color. The first predetermined distance $D_{th1}$ exemplified in the above embodiment is a fixed value, but alternatively, the predetermined distance $D_{th1}$ may be set to increase with the velocity V of the vehicle 1 as in the case of the second predetermined distance $D_{th2}$, and may also be set, for example, as a quadric function of the velocity V.

The second predetermined distance $D_{th2}$ and the predetermined value α illustrated in the maps of FIGS. 2 and 3, respectively, are merely examples, and should not be limited to those. Although the above embodiment designs the maps under condition 1, the velocity V may range differently between the maps of FIGS. 2 and 3, or the range of the velocity V may be omitted from the maps. Although each of the second predetermined distance $D_{th2}$ and the predetermined value α is set as a quadric function of the velocity V of the vehicle 1 in the above embodiment, one or both of the second predetermined distance $D_{th2}$ and the predetermined value α may be set as a linear function or an exponential function.

Further, the second predetermined distance $D_{th2}$ and the predetermined value α should not be limited to those designed in the maps as described above, and alternatively, may each be a fixed value set in the same manner as that of the first predetermined distance $D_{th1}$, or may be set in accordance with a parameter (s) other than the velocity V of the vehicle 1. For example, the above second predetermined distance $D_{th2}$ may be set in accordance with the relative velocities of the vehicle 1 and the preceding-vehicle since the following distance D2 between the vehicle 1 and the preceding-vehicle changes with the relative velocities of the vehicle 1 and the preceding-vehicle. Such a modification can enhance the accuracy of the estimation of whether the coasting state in the regeneration prohibited mode is to last for at shortest the predetermined period or not. As a consequence, it is possible to achieve both the enhanced electrical power efficiency and the ensured drivability of the vehicle 1 more sufficiently. It is to be noted that the relative velocities of the vehicle 1 and the preceding-vehicle can be obtained from, for example, the image data acquired by the camera 11 and/or from the radar 12.

Although the above embodiment assumes that the camera 11 and the radar 12 each acquire the information on the front of the vehicle 1 and the slope sensor 13 detects the slope θ of the road on which the vehicle 1 is traveling, other devices may alternatively acquire the information on the front of the vehicle 1 and the slope θ of the road. For example, non-illustrated navigation system installed in the vehicle 1 may be applicable. Specifically, the information on the front of the vehicle 1 and the slope of the road may be acquired (detected) by identifying the position of the vehicle 1 on the basis of an installed map data and signals received from a GPS satellite via a GPS receiver, and by referring to the identified position and the road information.

In addition, by utilizing this navigation system for example, a slope of a road on which the vehicle 1 is expected to travel (i.e., the slope of the road ahead of the vehicle 1) may be acquired, and the estimate may be formed on the basis of the acquired slope. Such a configuration can enhance the accuracy of the estimation. As a consequence, it is possible to achieve both the enhanced electrical power efficiency and the ensured drivability of the vehicle 1 more sufficiently.

Although the above embodiment assumes a configuration that the magnitude of the regenerative brake force is settable to multiple levels, other configurations are also applicable as far as the magnitude of the regenerative brake force is settable to zero. In other words, any vehicle is applicable if the regeneration prohibited mode is settable therein. The vehicle may be equipped with, as an alternative to the above paddle switch 18, for example, a switch that can change modes between the regeneration prohibited mode and a drive mode in which the electric power is to be regenerated (the regenerative brake is applicable) during the coast with the accelerator being off.

REFERENCE SIGNS LIST 1 vehicle
2 motor
3 inverter
6 determiner
7 estimator
8 controller
11 camera (obtainer)
12 radar (obtainer)
13 slope sensor (detector)

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A controlling apparatus for controlling a vehicle including a motor for traveling and an inverter for driving the motor, the controlling apparatus comprising:
    an obtainer acquiring information on a front of the vehicle;
    a determiner judging whether the vehicle is in a coasting state in a regeneration prohibited mode in which a regenerative brake is disabled or not;
    an estimator forming, if the determiner judges that the vehicle is in the coasting state in the regeneration prohibited mode, an estimate of whether the coasting state in the regeneration prohibited mode is to last for at shortest a predetermined period or not on a basis of the information acquired by the obtainer; and
    a controller shutting down the inverter if the estimator estimates that the coasting state in the regeneration prohibited mode is to last for at shortest the predetermined period.

2. The controlling apparatus according to claim 1, wherein:
    the obtainer acquires a distance from the vehicle to an object on a road in front of the vehicle; and
    the estimator estimates that the coasting state in the regeneration prohibited mode is to last for at shortest the predetermined period if the distance acquired by the obtainer is longer than or equal to a predetermined distance.

3. The controlling apparatus according to claim 2, wherein the object is a preceding-vehicle traveling in a lane through which the vehicle is traveling.

4. The controlling apparatus according to claim 2, wherein the predetermined distance is set to increase with increase in a velocity of the vehicle.

5. The controlling apparatus according to claim 3, wherein the predetermined distance is set to increase with increase in a velocity of the vehicle.

6. The controlling apparatus according to claim 4, wherein the predetermined distance is set as a quadratic function of the velocity of the vehicle.

7. The controlling apparatus according to claim 5, wherein the predetermined distance is set as a quadratic function of the velocity of the vehicle.

8. The controlling apparatus according to claim 1, further comprising
    a detector detecting a slope of a road on which the vehicle is traveling, and wherein
    the estimator forms the estimate on a basis of both the information acquired by the obtainer and the slope detected by the detector.

9. The controlling apparatus according to claim 8, wherein the estimator estimates that the coasting state in the regeneration prohibited mode is not to last for at shortest the predetermined period regardless of the information acquired by the obtainer if an absolute value of the slope detected by the detector is larger than a predetermined value.

10. The controlling apparatus according to claim 9, wherein the predetermined value is set to increase as a velocity of the vehicle increases on an upslope and as the velocity of the vehicle decreases on a downslope.

* * * * *